United States Patent
Kang

(10) Patent No.: US 7,535,677 B2
(45) Date of Patent: May 19, 2009

(54) DISK DRIVE SUSPENSION ASSEMBLY HAVING A SINGLE LIMITER AND RECORDING AND/OR REPRODUCING APPARATUS WITH SUSPENSION ASSEMBLY HAVING A SINGLE LIMITER

(75) Inventor: Tae-sik Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 550 days.

(21) Appl. No.: 11/229,701

(22) Filed: Sep. 20, 2005

(65) Prior Publication Data

US 2006/0092571 A1 May 4, 2006

(30) Foreign Application Priority Data

Sep. 20, 2004 (KR) .................. 10-2004-0075113

(51) Int. Cl.
*G11B 5/55* (2006.01)
(52) U.S. Cl. .................................... 360/245.7
(58) Field of Classification Search ............... 360/245.7
See application file for complete search history.

(56) References Cited

U.S. PATENT DOCUMENTS

| 5,771,136 A | 6/1998 | Girard |
| 6,172,853 B1 | 1/2001 | Davis et al. |
| 6,233,121 B1 | 5/2001 | Pan |
| 6,243,235 B1 | 6/2001 | Fu et al. |
| 6,445,546 B1 * | 9/2002 | Coon ................. 360/245.7 |
| 6,462,911 B1 | 10/2002 | Tokuyama et al. |
| 6,611,402 B1 | 8/2003 | Mangold |
| 6,801,400 B2 * | 10/2004 | Fu et al. .............. 360/245.7 |

FOREIGN PATENT DOCUMENTS

| JP | 2000-076810 | 8/1998 |
| JP | 2000-195209 | 7/2000 |
| JP | 2002-133810 | 5/2002 |
| WO | 97/21212 | 6/1997 |
| WO | 97/43757 | 11/1997 |

OTHER PUBLICATIONS

European Search Report issued Aug. 7, 2007 in corresponding European Patent Application No. 05020518.6-1232.
Korean Notice of Office Action for Application No. 10-2004-0075113, issued Feb. 28, 2006.

* cited by examiner

*Primary Examiner*—A. J. Heinz
(74) *Attorney, Agent, or Firm*—Staas & Halsey LLP

(57) ABSTRACT

A suspension assembly installed on an end of a swing arm and elastically biasing a slider with a read/write head toward a surface of a disk in a disk drive. The suspension assembly includes a load beam coupled to the one end of the swing arm, a flexure coupled to the load beam and supporting the slider, and a hook limiter having a fixed end fixed to the flexure, and a free end extending toward a front end of the load beam and spaced a predetermined distance from the load beam.

11 Claims, 5 Drawing Sheets

DISK DRIVE SUSPENSION ASSEMBLY HAVING A SINGLE LIMITER AND RECORDING AND/OR REPRODUCING APPARATUS WITH SUSPENSION ASSEMBLY HAVING A SINGLE LIMITER

CROSS-REFERENCE TO RELATED APPLICATIONS

This application claims the priority benefit of Korean Patent Application No. 10-2004-0075113, filed on Sep. 20, 2004, in the Korean Intellectual Property Office, the disclosure of which is incorporated herein in its entirety by reference.

BACKGROUND OF THE INVENTION

1. Field of the Invention

Embodiments of the present invention relate to a recording and/or reproducing apparatus, e.g., a disk drive, and more particularly, to a disk drive including a suspension assembly with a limiter that can limit roll and pitch movements for a flexure caused by external shocks or vibrations in order to prevent damage to a slider and a head of the disk drive.

2. Description of the Related Art

Hard disk drives (HDDs), which can be used to store information for computers, reproduce and/or record data from/to a disk using a read/write head, for example.

Head parking methods for the HDDs can roughly be classified into contact start stop (CSS) methods or ramp loading methods.

In the CSS methods, a slider can rest on a surface of a parking zone, formed along an inner circumference of the disk in a HDD, due to an elastic force of a suspension assembly when a HDD does not operate, that is, when the disk is not rotating.

In the ramp loading methods, a ramp can be installed outside the circumference of the disk and a corresponding head of the HDD can be parked on the ramp when the HDD is not operating.

FIG. 1 illustrates a disk drive, with FIG. 2 illustrating a vertical sectional view of a suspension assembly used in such a disk drive.

Referring to FIGS. 1 and 2, the disk drive may include a medium, e.g,. a disk 1, a spindle motor 2 rotating the disk 1, and an actuator 3 moving a read/write head (not shown) to a desired position on the disk 1. The read/write head can be used to reproduce and/or record data from/to the disk 1.

In detail, the actuator 3 can include a swing arm 4, rotating due to a rotational force produced by a voice coil motor (VCM, not shown), and a suspension assembly 5 installed along an end of the swing arm 4. The suspension assembly 5 can elastically bias an air bearing slider 8, on which the read/write head is mounted, toward a surface of the disk 1.

In further detail, the suspension assembly 5 can include a load beam 6 coupled to an end of the swing arm 4, a flexure 7 extending from a rear surface of the load beam 6, and the air bearing slider 8 coupled to a rear surface of the flexure 7. The flexure 7 can support the slider 8, on which the read/write head is mounted. The slider 8, with the head thereon, can fly at a predetermined height above the surface of the disk 1 due to a lifting force produced by rotation of the disk 1, thereby maintaining a predetermined distance between the head and the surface of the disk 1.

Further, a dimple 9, formed on the load beam 6, can protrude toward the flexure 7. The dimple 9 can provide a predetermined elastic force to the flexure 7. In this structure, the flexure 7 may move more freely, within desired bounds, such that smooth roll and pitch movements of the slider 8 attached to the flexure 7 can be made.

In the ramp loading method, the actuator 3 can be loaded over the disk 1 to reproduce data recorded in the disk 1 and/or record data to the disk 1. When the data reproduction or storage process is not performed, the actuator 3 can be parked on the ramp that is installed on an outer circumference side, spaced a predetermined distance from the disk 1.

In the ramp loading mode, when the actuator 3 is unloaded from being over the disk 1, to move to the ramp, a negative pressure is applied to the slider 8, such that the load beam 6 and the flexure 7 become spaced apart from each other. In addition, an end-tap can be formed on an end portion of the actuator 3. When unloaded, the actuator 3 contacts the ramp and then rises along a slope of the ramp. However, during the rise of the actuator 3, the flexure 7 maintains its existing orientation, due to inertia, at the same height as when the end-tap contacts the ramp. Accordingly, as noted above, the flexure 7 can become temporarily separated from the dimple 9, thereby separating the load beam 6 from the flexure 7. If the load beam 6 becomes separated from the flexure 7, in this way, there is a risk that the slider 8 may collide with the disk, causing damage to the head mounted on the slider 8 and/or the disk 1.

In order to prevent such damage, in the conventional HDDs, a limiter 10 is formed on the conventional suspension assembly 5. The limiter 10 has an end fixed to the flexure 7, and a free end extending through a hole 20 formed in the load beam 6 to face a top surface of the load beam 6. With this structure, if the flexure 7 separates from the load beam 6, a bottom surface of the free end of the limiter 10 can contacts the top surface of the load beam 6, thereby limiting the distance between the separated flexure 7 and load beam 6 to a predetermined range.

Although the conventional limiter 10 may effectively control a vertical movement of the flexure 7, the limiter 10 cannot control roll and pitch movements of the free end of the flexure 7 along bend portions, discussed below, caused by external shocks or vibrations.

FIG. 3 is a vertical sectional view of a pair of opposing conventional suspension assemblies, with flexures thereof rolling and pitching.

Referring to FIG. 3, when a HDD employs a plurality of suspension assemblies 5 and 12, the suspension assemblies 5 and 12 can be paired to face each other. That is, respective load beams 6 and 13, flexures 7 and 14, sliders 8 and 15, dimples 9 and 16, and limiters 10 and 17 can be oriented to face each other. Here, reference numerals 11 and 18 denote the aforementioned bent portions formed when the flexures 7 and 14 are bent at a predetermined angle.

Before being assembled into a main body of the disk drive, the facing suspension assemblies 5 and 12 are moved. If external shocks or vibrations are applied to the suspension assemblies 5 and 12 during the movement, the flexures 7 and 14 roll and pitch about the bent portions 11 and 18 due to the shocks or vibrations.

As described above, the respective conventional limiters 10 and 17 can act as stoppers to control vertical movements of the flexures 7 and 14, but cannot act as stoppers to control roll and pitch movements of the flexures 7 and 14 about bent portions 11 and 18. Specifically, as shown in FIG. 3, respective free ends of the limiters 10 and 17, facing the load beams 6 and 13, extend toward fixed ends of the flexures 7 and 14. Accordingly, when respective flexures 7 and 14 roll and pitch about the bent portions 11 and 18, the free ends of the limiters 10 and 17 actually become spaced further apart from the load beams 6 and 13. Accordingly, the limiters 10 and 17 fail to control, within a predetermined range, roll and pitch movements of the sliders 8 and 15 caused by the roll and pitch movements of the flexures 7 and 14, leading to potential contact between the sliders 8 and 15. Due to such contacts, heads mounted on or under the sliders 8 and 15 may be damaged.

SUMMARY OF THE INVENTION

Embodiments of the present invention provide a disk drive with a hook limiter acting as a stopper to control both a vertical movement and roll and pitch movements of a flexure, thereby preventing damage to a head and a slider attached to a bottom surface of the flexure due to an impact, and a method thereof.

To achieve the above and/or other aspects and advantages, embodiments of the present invention include a suspension assembly on an end of a swing arm and elastically biasing a slider, with a read/write head thereon, toward a surface of a disk in a disk drive, the suspension assembly including a load beam coupled to an end of the swing arm, a flexure coupled to the load beam, supporting the slider, and a limiter having a fixed end, fixed to the flexure, and a free end extending in a direction toward a front end of the load beam, away from an area of the load beam coupling the flexure to the load beam, and spaced a predetermined distance from the load beam.

A distance between the free end of the limiter and the load beam may be less than ½ of a stationary distance between two sliders that could face each other in the disk drive.

In addition, when the free end of the limiter contacts the load beam the contact may produce a counteracting force, acting as a stopper, to limit roll and pitch movements of the flexure and the slider before the slider contacts other portions of the disk drive.

The free end of the limiter may also be in a point contact with the load beam to limit roll and pitch movements of the flexure.

Further, the limiter may pass through a hole in the load beam. The limiter may also have a hooked shape.

To achieve the above and/or other aspects and advantages, embodiments of the present invention include a recording and/or reproducing apparatus, including a medium to store data, and an actuator to move a read/write head to a position of the medium, wherein the actuator includes a suspension assembly on end of a swing arm to elastically bias a slider, with the read/write head thereon, toward the medium to reproduce and/or record data from/to the medium, and with the suspension assembly further including a load beam coupled to an end of the swing arm, a flexure coupled to the load beam, supporting the slider, and a limiter having a fixed end, fixed to the flexure, and a free end extending in a direction toward a front end of the load beam, away from an area of the load beam coupling the flexure to the load beam, and spaced a predetermined distance from the load beam.

The recording and/or reproducing apparatus may be a hard disk drive.

To achieve the above and/or other aspects and advantages, embodiments of the present invention include a slider collision prevention method, for a disk drive including a suspension assembly on end of a swing arm elastically biasing a slider, with a read/write head thereon, toward a surface of a disk in the disk drive, the method including supporting the slider through a flexure coupled to a load beam, the load beam coupled to an end of the swing arm, and limiting roll and pitch of the slider by a free end of a limiter, with a fixed end being fixed to the flexure, contacting the load beam such that the contact produces a counteracting force, acting as a stopper, to limit roll and pitch movements of the flexure and the slider before the slider contacts other portions of the disk drive.

The free end of limiter may extend in a direction toward a front end of the load beam, away from an area of the load beam coupling the flexure to the load beam, spaced a predetermined distance from the load beam. The method may further include maintaining a distance between the free end of the limiter and the load beam of less than ½ of a stationary distance between two sliders that could face each other in the disk drive, when the flexure is in contact with a portion of the load beam. The portion of the load beam may be a dimple on the load beam enabling freedom in movement of the flexure in roll and pitch directions.

To achieve the above and/or other aspects and advantages, embodiments of the present invention include a recording and/or reproducing apparatus, including a medium to store data, and an actuator to move a read/write head to a position of the medium, wherein the actuator includes a suspension assembly to elastically bias a slider, with the read/write head thereon, toward the medium to reproduce and/or record data from/to the medium, wherein the suspension assembly further includes a flexure coupled to a load beam of the actuator to support the slider, and a limiter means for limiting roll and pitch movements of the flexure and the slider before the slider contacts other portions of the recording and/or reproducing apparatus.

To achieve the above and/or other aspects and advantages, embodiments of the present invention include a suspension assembly on end of a swing arm and elastically biasing a slider, with a read/write head thereon, toward a surface of a disk in a disk drive, the suspension assembly including a flexure supporting the slider, and a limiter means for limiting roll and pitch movements of the flexure and the slider before the slider contacts other portions of the disk drive.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
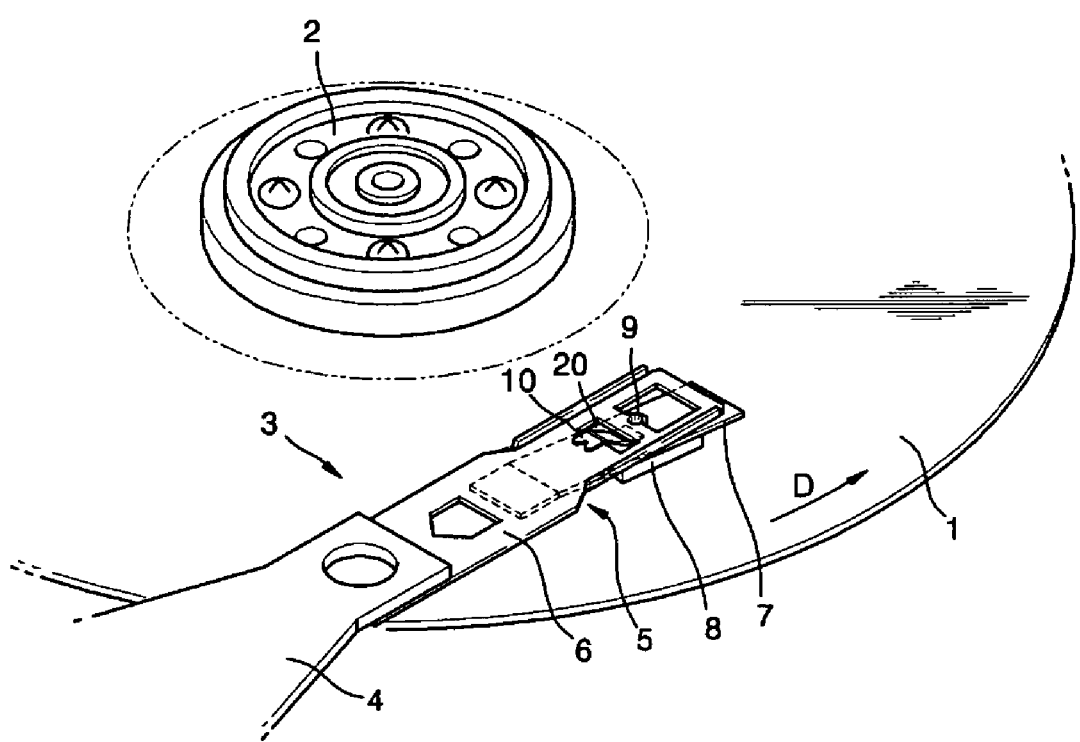
FIG. 1 illustrates a disk drive.
Figure 2:
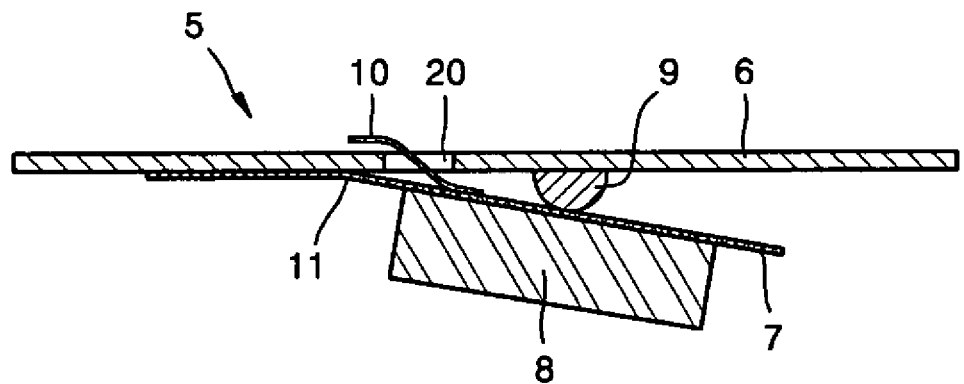
FIG. 2 illustrates a suspension assembly used in a disk drive, such as that shown in FIG. 1.
Figure 3:
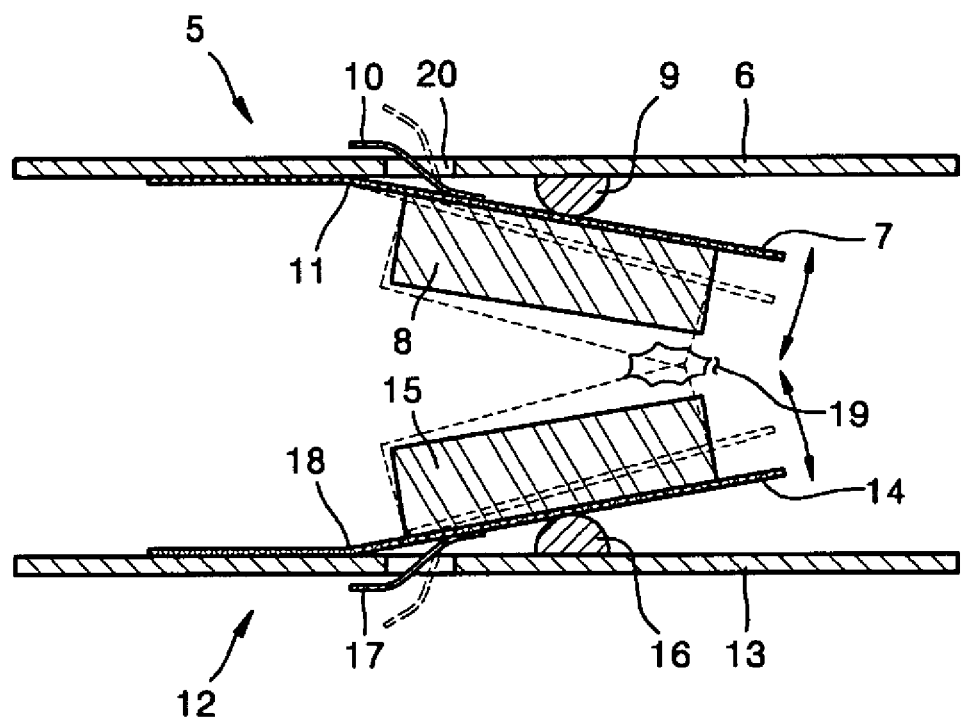
FIG. 3 illustrates a pair of opposing suspension assemblies when flexures thereof roll and pitch.

Reference will now be made in detail to embodiments of the present invention, examples of which are illustrated in the accompanying drawings, wherein like reference numerals refer to the like elements throughout. The embodiments are described below to explain the present invention by referring to the figures. Also, a hard disk drive will be described as an example of a recording and/or reproducing apparatus, but the present invention is not limited thereto.

Figure 4:
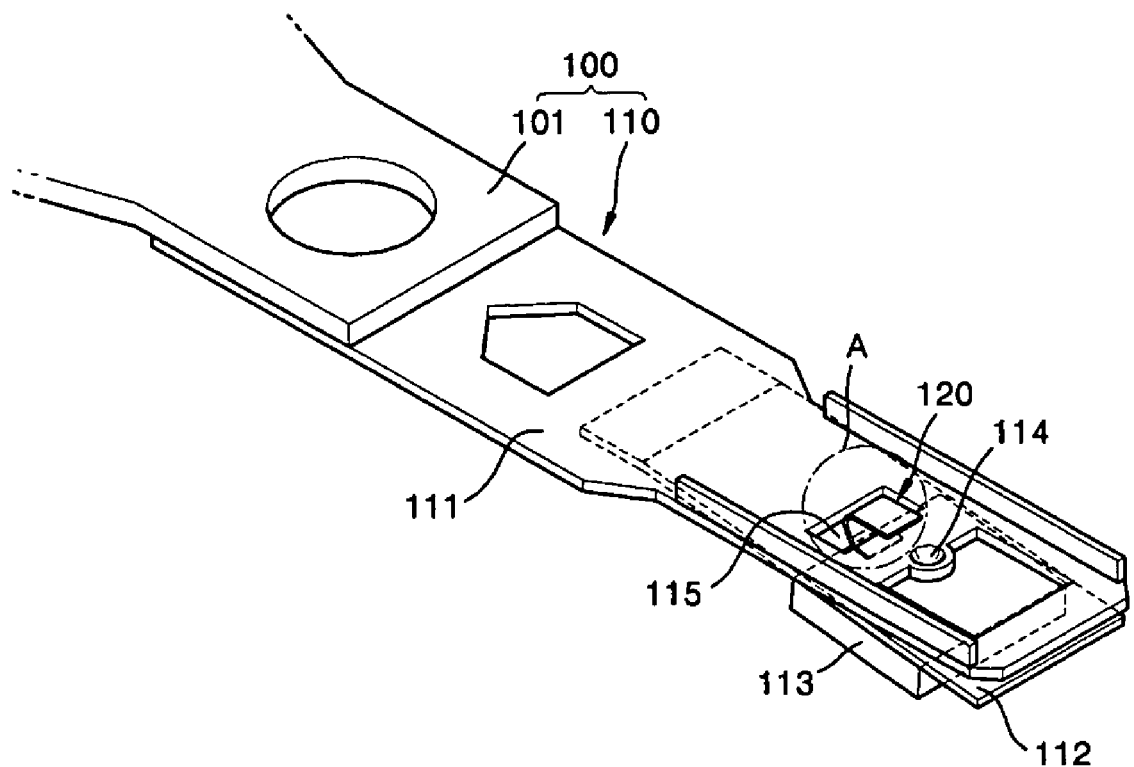
FIG. 4 illustrates an actuator including a suspension assembly, according to an embodiment of the present invention.
Figure 5:
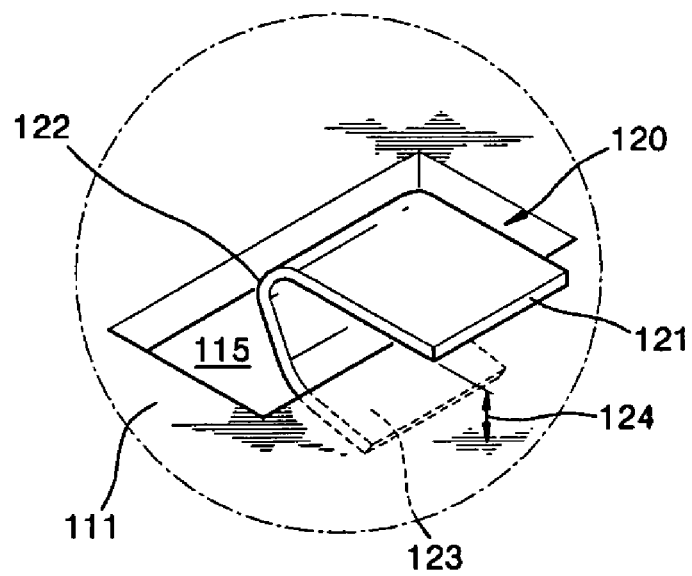
FIG. 5 illustrates portion A of the actuator illustrated in FIG. 4, according to an embodiment of the present invention.

FIG. 4 illustrates a perspective view of an actuator including a suspension assembly for a disk drive, according to an embodiment of the present invention, with FIG. 5 illustrating an enlarged perspective view of portion A of the actuator shown in FIG. 4, according to an embodiment of the present invention.

Referring to FIGS. 4 and 5, an actuator 100 including a suspension assembly 110 can move a read/write head (not shown) to a desired position on the disk.

In detail, the actuator 100 can include a swing arm 101, rotating from a rotational force produced by a voice coil motor (VCM, not shown), and the suspension assembly 110 installed on an end of the swing arm 101. The suspension assembly 110 may elastically bias an air bearing slider 113, on which the read/write head is mounted, toward a surface of the disk.

In further detail, the suspension assembly 110 may include a load beam 111, a flexure 112, the air bearing slider 113 with the head thereon, and a limiter 120. It may be preferable that the limiter 120 has a hooked shape. For the convenience of explanation, the limiter 120 is described as the hook limiter 120 in embodiments of the present invention.

The load beam 111 can be coupled to an one end of the swing arm 101. The load beam 111 may generally be made by pressing a thin metal plate with a thickness of approximately 0.05 mm, such as a stainless steel sheet, according to an embodiment of the present invention, noting that the invention is not limited thereto. A dimple 114 can be formed on the load beam 111 to provide a predetermined elastic force to the flexure 112. In this structure, the flexure 112 can move freely against the dimple 114, such that smooth roll and pitch movements of the slider 113 attached to the flexure 112 can be made. A hole 115 through which the hook limiter 120 passes can be formed in the load beam 111. Here, one side of the hook limiter 120 can pass through the hole 115 to face a top surface of the load beam 111.

The flexure 112 can be attached to a bottom surface of the load beam 111, facing the disk, to support the slider 113. One end of the flexure 112 can be fixed, e.g., by welding or the like, to the bottom surface of the load beam 111 facing the disk, and another end of the flexure 112 can extend freely toward an end of the load beam 111. The flexure 112 can be made of thin stainless steel sheet, similar to the load beam 111, according to an embodiment of the present invention, noting again that the invention is not limited thereto. To achieve free roll and pitch movements of the slider 113, attached to a rear surface of the flexure 112, the flexure 112 may have a thickness of approximately 0.02 mm less than the thickness of the load beam 111, according to an embodiment of the present invention.

According to an embodiment of the present invention, the aforementioned hook limiter 120 can pass through the hole 115 formed in the load beam 111, and may include a free end 121, a curved portion 122, and a fixed end 123.

The free end 121 of the hook limiter 120 can be spaced a predetermined distance 124 from the load beam 111 to prevent contact with the load beam 111 when the flexure 112 rolls and pitches, thereby ensuring smooth roll and pitch movements of the flexure 112.

The curved portion 122 of the hook limiter 120 can have a predetermined radius of curvature and can connect the free end 121 and the fixed end 123, with the hook limiter 120 being fixed to the flexure 112 at the fixed end 123.

The hook limiter 120 can act as a stopper to control a vertical movement or roll and pitch movements of the flexure 112 caused by external shocks or vibrations, which will be explained in greater detail later.

Figure 6:
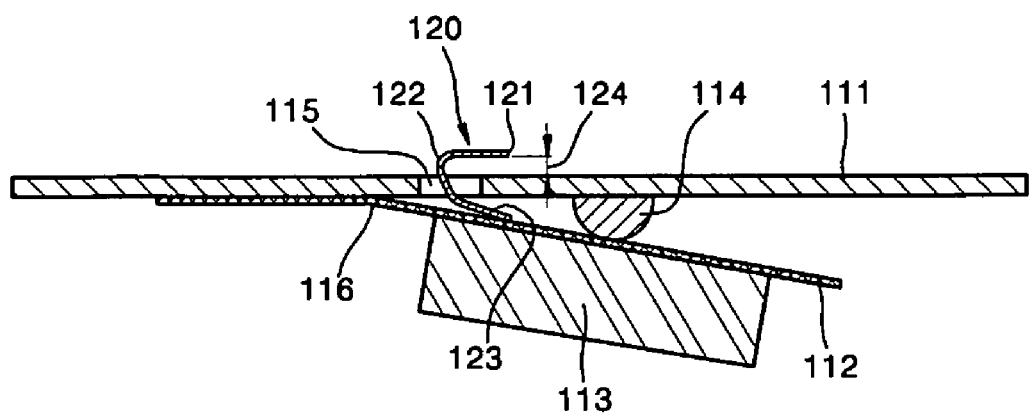
FIG. 6 illustrates a suspension assembly of a disk drive, according to an embodiment of the present invention.
Figure 7:
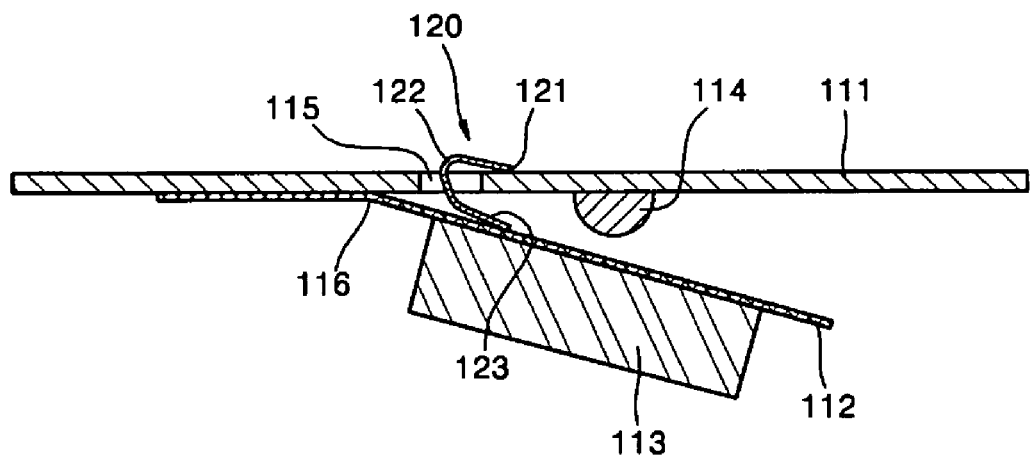
FIG. 7 illustrates a hook limiter that can act as a stopper when a flexure in a suspension assembly rolls and pitches, according to an embodiment of the present invention.

FIG. 6 illustrates a suspension assembly of a disk drive and FIG. 7 illustrates a hook limiter that acts as a stopper when the flexure rolls and pitches.

Referring to FIGS. 6 and 7, the suspension assembly 110 of the disk drive can include the load beam 111, the flexure 112 installed on the load beam 111, the slider 113 installed on the flexure 112, the dimple 114 permitting free roll and pitch movements of the slider 113, and the hook limiter 120 fixed to the flexure 112, according to embodiments of the present invention. The hook limiter 120 can include the free end 121, the curved portion 122, and the fixed end 123. The hook limiter 120 can further pass through the hole 115 formed in the load beam 111, with reference numeral 116 denoting the aforementioned bent portion of the flexure 112.

In general, the flexure 112 can have one side contacting/pressing the dimple 114, under a predetermined pressure. When the flexure 112 normally moves through contact with the dimple 114, the slider 113 can pitch and roll freely. At this time, since the free end 121 of the hook limiter 120 is still spaced a predetermined distance from the load beam 111, the hook limiter 120 does not act as a stopper to limit the movements of the flexure 112 and the slider 113.

However, if external shocks or vibrations are applied to the suspension assembly 110, the flexure 112 may further roll and pitch. If the flexure 112 and the load beam 111 become further separated from each other, due to the roll and pitch movements of the flexure 112, the hook limiter 120 can act as a stopper to limit the movements of the flexure 112 and the slider 113.

In detail, if the flexure 112 rolls and pitches, the hook limiter 120 fixed to the flexure 112 at the fixed end 123 similarly rolls and pitches. If the flexure 112 and the load beam 111 become excessively separated from each other, the free end 121 of the hook limiter 120 will contact the load beam 111 with such a force to counteract the roll and pitch movements applied to the hook limiter 120. The hook limiter 120 and the flexure 112, thereby, will stop rolling and pitching, due to the counteracting force, and the hook limiter 120 will have acted as a stopper to control the movements of the flexure 112 and the slider 113.

In particular, the counteracting force, generated when the free end 121 of the hook limiter 120 contacts the load beam 111, produces a moment with respect to the flexure 112. The moment produced by the counteracting force offsets a moment produced by the external shocks or vibrations causing the flexure 112 to rotate about the bent portion 116. As a result, since the hook limiter 120 can control the roll and pitch movements, as well as the conventional vertical movement of the flexure 112, the hook limiter 120 can more effectively act as a stopper compared to a conventional hook limiter.

Here, the hook limiter 120 can have a hook shape, such that the free end 121 of the hook limiter 120 can come into point contact with the load beam 111.

Figure 8:
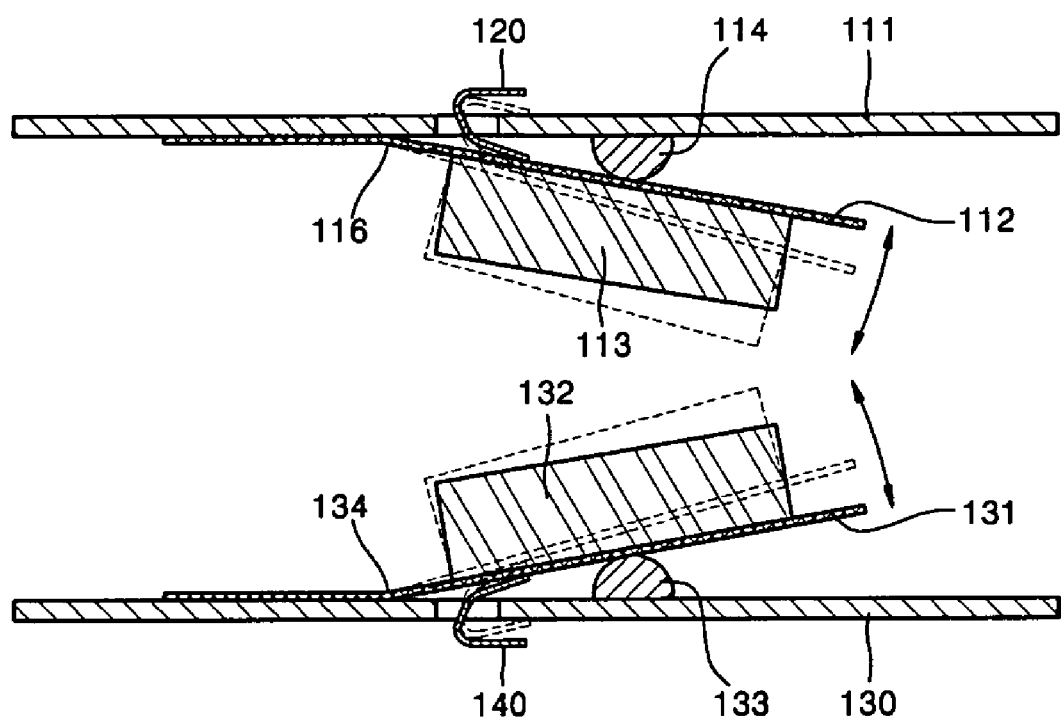
FIG. 8 illustrates of a pair of opposing suspension assemblies of a disk drive, according to an embodiment of the present invention, when flexures roll and pitch.

FIG. 8 illustrates a pair of opposing suspension assemblies of a disk drive, according to an embodiment of the present invention, when flexures roll and pitch.

Referring to FIG. 8, the pair of suspension assemblies can respectively include load beams 111 and 130, flexures 112 and 131, sliders 113 and 132, dimples 114 and 133, and hook limiters 120 and 140, each of which face each other. Reference numerals 116 and 134 represent respective bent portions of the hook limiters 120 and 140.

As shown in FIG. 8, if external shocks or vibrations are applied to the pair of suspension assemblies, the flexures 112 and 131 vertically move, as well as roll and pitch about respective bent portions 112 and 131. During the movements, respective flexures 112 and 131 may repeatedly separate from dimples 114 and 133, thereby separating from load beams 111 and 130. If the roll and pitch movements of the flexures 112 and 131 cannot be controlled, the pair of suspension assemblies may collide, thereby potentially damaging each other. Particularly, if the facing sliders 113 and 132 collide with each other, it is highly probable that the respective sliders 113 and 132 and heads mounted on the sliders 113 and 132 may become damaged.

According to embodiments of the present invention, corresponding hook limiters can be used to solve the aforementioned problems. However, conventional hook limiters can only control vertical movements of flexures, thereby failing to control roll and pitch movements of the flexures. Hook limiters 120 and 140, according to embodiments of the present invention, however, can control roll and pitch movements as well as vertical movements of the respective flexures 112 and 131, as described above, thereby preventing damage to the respective sliders 113 and 131 and corresponding heads. To minimize the potential for damage, it may be preferable that a distance between free ends of the respective hook limiters 120 and 140 and the load beams 111 and 130 be less than ½ of a normal distance between the facing sliders 113 and 132, e.g., the distance between the facing sliders 113 and 132 when the disk drive is stationary without movement of the flexures, according to an embodiment of the present invention.

As described above, according to an embodiment of the present invention, since a hook-shaped limiters can be installed on suspension assemblies of a disk drive, the hook limiters can function as stoppers to limit both the vertical movement and the roll and pitch movements of the flexures caused by external shocks or vibrations. Accordingly, collisions between facing suspension assemblies, and particularly, between facing sliders, can be prevented, thereby preventing damage to the sliders and the heads mounted on the sliders.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A suspension assembly on an end of a swing arm and elastically biasing a slider, with a read/write head thereon, toward a surface of a disk in a disk drive, the suspension assembly comprising:

a load beam coupled to an end of the swing arm;

a flexure coupled to the load beam, supporting the slider; and a single limiter having a fixed end, fixed to the flexure, and a free end extending in a direction toward a front end of the load beam, away from an area of the load beam coupling the flexure to the load beam, and spaced a predetermined distance from the load beam, wherein the suspension assembly includes only the single limiter to limit roll and pitch movements of the flexure and the slide relative to the load beam.

2. The suspension assembly of claim 1, wherein a distance between the free end of the single limiter and the load beam is less than ½ of a stationary distance between two sliders that could face each other in the disk drive.

3. The suspension assembly of claim 1, wherein when the free end of the single limiter contacts the load beam the contact produces a counteracting force, acting as a stopper, to limit the roll and pitch movements of the flexure and the slider before the slider contacts other portions of the disk drive.

4. The suspension assembly of claim 1, wherein the single limiter has a hooked shape.

5. The suspension assembly of claim 1, wherein the single limiter passes through a hole in the load beam.

6. A recording and/or reproducing apparatus, comprising:

a medium to store data; and an actuator to move a read/write head to a position of the medium, wherein the actuator comprises a suspension assembly on an end of a swing arm to elastically bias a slider, with the read/write head thereon, toward the medium to reproduce and/or record data from/to the medium, and with the suspension assembly further comprising a load beam coupled to an end of the swing arm, a flexure coupled to the load beam, supporting the slider, and a single limiter having a fixed end, fixed to the flexure, and a free end extending in a direction toward a front end of the load beam, away from an area of the load beam coupling the flexure to the load beam, and spaced a predetermined distance from the load beam, wherein the suspension assembly includes only the single limiter to limit roll and pitch movements of the flexure and the slide relative to the load beam.

7. The apparatus of claim 6, wherein the single limiter has a hooked shape.

8. The apparatus of claim 6, wherein the recording and/or reproducing apparatus is a hard disk drive.

9. The apparatus of claim 6, wherein a distance between the free end of the single limiter and the load beam is less than ½ of a stationary distance between two sliders that could face each other in the recording and/or reproducing apparatus.

10. The apparatus of claim 6, wherein when the free end of the single limiter contacts the load beam the contact produces a counteracting force, acting as a stopper, to limit the roll and pitch movements of the flexure and the slider before the slider contacts other portions of the recording and/or reproducing apparatus.

11. The apparatus of claim 6, wherein the single limiter passes through a hole in the load beam.

* * * * *